(12) United States Patent
Fackert et al.

(10) Patent No.: US 10,355,493 B1
(45) Date of Patent: Jul. 16, 2019

(54) SYSTEM AND METHOD FOR SUPPLYING POWER AND MULTI-CHANNEL DATA TO A STAGE EFFECTS DEVICE

(71) Applicant: C.A.E., Inc., Hamburg, MI (US)

(72) Inventors: James H. Fackert, Brighton, MI (US); Glenn Witalec, Port Huron, MI (US)

(73) Assignee: C.A.E., INC., Hamburg, MI (US)

( * ) Notice: Subject to any disclaimer, the term of this patent is extended or adjusted under 35 U.S.C. 154(b) by 172 days.

(21) Appl. No.: 15/664,475

(22) Filed: Jul. 31, 2017

Related U.S. Application Data

(60) Provisional application No. 62/369,245, filed on Aug. 1, 2016.

(51) Int. Cl.
*H05B 33/08* (2006.01)
*H02J 5/00* (2016.01)
*H04L 12/10* (2006.01)

(52) U.S. Cl.
CPC ............... *H02J 5/00* (2013.01); *H04L 12/10* (2013.01); *H05B 33/0842* (2013.01)

(58) Field of Classification Search
CPC ......... H02J 5/00; H04L 12/10; H05B 33/0842
See application file for complete search history.

(56) References Cited

U.S. PATENT DOCUMENTS

2016/0219679 A1* 7/2016 Snyder ............... H05B 33/0815

* cited by examiner

*Primary Examiner* — Robert L Deberadinis
(74) *Attorney, Agent, or Firm* — Quinn IP Law

(57) ABSTRACT

A system provides power and data to solid-state lights or other stage effects devices. A power hub receives the data as an input signal and includes output ports each with data conductors and power conductor pairs. The hub includes a buffer circuit, a power distribution circuit, and sensor circuits. The buffer circuit distributes data to the output ports. The power distribution circuit receives an input voltage and distributes a calibrated output voltage and maximum current to each output port. The sensor circuits are connected to a respective output port and detect connection of devices and a maximum required power at each output port. The power distribution circuit individually increases voltage to each output port at a calibrated ramp rate based on the maximum required power. The interface circuit connects the data conductors and the power conductor pairs to the devices and passes the voltage/power and data thereto.

19 Claims, 2 Drawing Sheets

SYSTEM AND METHOD FOR SUPPLYING POWER AND MULTI-CHANNEL DATA TO A STAGE EFFECTS DEVICE

CROSS-REFERENCE TO RELATED APPLICATIONS

This application claims priority to U.S. Provisional Application No. 62/369,245, entitled SYSTEM AND METHOD FOR SUPPLYING POWER AND MULTI-CHANNEL DATA TO A STAGE EFFECTS DEVICE, which was filed on Aug. 1, 2016, and which is hereby incorporated by reference in its entirety.

TECHNICAL FIELD

The present disclosure relates to a system and method for supplying electrical power and multi-channel data to lamps or other stage effects devices.

BACKGROUND

Stage effects are used to enhance the overall audience enjoyment of musical and theatrical performances. For instance, lighting of stage surfaces, props, performers, and even the audience itself may be achieved via strategically positioned lighting fixtures each configured to produce a desired lighting effect. Spot lights, Fresnel lamps, parabolic aluminized reflectors or PAR cans, and ellipsoidal reflector lamps are common examples of such fixtures. The lighting fixtures may be suspended overhead from trusses and controlled by an operator using a lighting board or control console. Mirror balls, smoke machines, pyrotechnics, and video devices are other examples of stage effects devices of the type that require electrical power and integrated control functionality.

In order to improve energy efficiency and enhance color control, traditional incandescent lamps may be replaced by solid-state lighting fixtures utilizing single or multi-colored light-emitting diodes (LEDs). LED fixtures are able to achieve lighting effects comparable to incandescent lamps while consuming a fraction of the power. As a result, 500-1000 W incandescent lamps are being replaced with solid-state lamps in the 20-100 W range, while certain emerging solid-state lamps of 250 W or more producing higher-power lighting effects.

Modern solid-state lighting fixtures generally have built-in power supplies and 120 VAC-rated power. Because conventional systems rely on 15 and 20 amp rated circuits, the power supplies and associated electrical connectors, cables, and supply circuitry tend to be unnecessarily expensive and bulky relative to the much lower power levels needed by new solid state light sources. Additionally, the new lighting hardware is vulnerable to power line surges, and also may pull a high inrush current when power is initially applied. In many cases, circuit breakers and electrical wiring must be overbuilt by four or more times with respect to the actual running power of the lighting fixtures in order to handle the large inrush current, thus negating potential cost savings from the solid-state efficiency gains.

Stage effects are typically controlled using multi-channel addressing according to the DMX-512 protocol, or DMX for short. The DMX protocol, which is ubiquitous in the entertainment field, is also used in architectural and landscape lighting applications. As a specialized application of the RS-422 serial communication standard, DMX is also a "multi-drop"-capable protocol that allows a number of lamp fixtures or other loads to be daisy-chained in a single run of cable that is terminated at the cable's endpoint. As such, DMX is useful in controlling large arrays of stage effects such as color-changing and moving lights, moving lasers, mirror ball rotation, and non-lighting stage effects. Using DMX512-A, for instance, 512 separate individually-addressable channels are available for transmission of 256 level increments or other commands to achieve a range of desired lighting effects, e.g., via transmission of digital bit strings.

An extension of the DMX protocol referred to as Remote Device Management (RDM) allows for limited two-way communication with a controlled device, e.g., the lighting fixtures and other devices noted above. RDM allows the controller to identify the lamp manufacturer type, serial number, software version, and operating and fault conditions of the RDM-enabled DMX device. DMX is traditionally carried over shielded twisted pair cables with 5 pin (and sometimes 3 pin) XLR-type connectors, with some movement toward using 4 pair data cable and RJ45 connectors of the type used for Ethernet network connections. Such cables provide the advantage of carrying DMX signals over inexpensive cables with quickly and reliably terminated connectors. In such a configuration, the extra conductors are left unused.

The Power over Ethernet (POE) standard provides electrical power and data through 4-pair cables and RJ45 connectors in certain low-power applications. Designed for powering computer monitors, switches, and voice-over-internet protocol (VOIp) telephones, POE is also currently used in some commercial lighting and security systems in which the power requirement to the individual fixtures is relatively low, and where it is desirable to have bi-directional communication, e.g., to communicate with occupancy sensors, ambient light sensors, and/or Ethernet-linked devices. CAT5 or CAT6 Ethernet cable may be used as part of the POE standard. CAT5 uses four twisted pairs of a 24-gauge electrical conductor. By comparison, CAT6 uses four twisted pairs of 23-gauge electrical conductors, while some emerging Ethernet cable designs use 22-gauge conductors. The POE standard requires that two conductor pairs in parallel provide 30 W of power, or that four pairs in parallel provide 60 W, with a cable run limit of 1000 feet.

However, the power levels made possible by POE remain inadequate for higher power lighting fixtures and other devices of the type used for stage lighting and other effects of the types described generally above, as is the requirement in the Ethernet protocol for separate cables leading from the hub to each controlled device. For instance, power transmission occurring over CAT5 Ethernet cable is generally limited to the above-noted 30-60 W power range at 48 VDC. The POE standard also requires data transformers and electronics with a high current rating and high-speed data coupling in order to allow transmission of both data and power over all four of the conductor pairs. Also, RJ45-type connectors are designed for data and for limited current, and are easily damaged by arcing during connection and disconnection, especially with inrush exceeding the current rating of the connector. CAT5 and similar cables are also limited in their capacity to provide significant current over the long distances required by POE standards, i.e., 600-1000 feet. CAT5 current handling capacity may be adequate over shorter lengths (25-100 feet) typical of a stage lighting system.

SUMMARY

A system and method are disclosed herein that are usable with a typical lighting board or control console to supply electrical power and multi-channel data to solid-state lighting or other stage effects devices. While the term "stage" is used herein to indicate a typical target area for illumination or other effects, those of ordinary skill in the art will appreciate that the disclosure has other beneficial uses, such as but not limited to architectural lighting systems where the complexity and lack of versatility of POE is a disadvantage. In other words, the "stage" may be any area or surface targeted by the stage effects devices disclosed herein.

The present disclosure is intended to address some of the limitations set forth above using a power hub to output higher power (e.g., 250-2400 W) to multiple DMX or other data output ports. The power hub communicates with multiple connected lighting fixtures or other stage effects devices via corresponding interface circuits which protect the cables and connectors from overload while delivering power and data to the connected devices at each output port. Power delivery to an outlet port occurs only when the power hub detects, via proportional resistance sensing of the interface circuit, that the appropriate power requirements are present on the output port.

In an example embodiment, the system includes a power hub and multiple interface circuits. The power hub is configured to receive multi-channel data from a control console as a data input signal, and includes multiple "power plus data" (P+D) output ports each having multiple data conductors and power conductor pairs carrying respective data and power signals. That is, each P+D outlet port has a pair of data conductors and multiple power conductor pairs.

The power hub further includes a data buffer circuit, one or more power distribution circuits, and sensor circuits. The buffer circuit distributes data from the input signal to the output ports. For instance, the buffer circuit may be embodied as a DMX splitter, an isolated splitter, or a DMX/RDM splitter-combiner.

Each power distribution circuit receives an input voltage from a power supply and, in turn, distributes a calibrated reduced output voltage to each of the output ports. Each sensor circuit is connected to a respective one of the output ports and is configured to detect a connection of one or more interface-equipped stage effects devices to the respective P+D output port. The sensor circuit determines the maximum required power to be delivered to each output port to power the stage effects devices connected thereto, while preventing excess current flow to the stage effects devices should a fault occur.

The power distribution circuit is in communication with each of the sensor circuits, and individually increases voltage to each of the P+D output ports at a calibrated ramp rate based on the outlet port's maximum required power, thus preventing excessive inrush current upon connection of the stage effects devices.

The interface circuits connect to the data and power conductors of the hub, and are configured to pass the data to a respective one of the stage effects devices, convert input power on the power conductors to a voltage and power required by the stage effects devices, and connect the conductor pairs to the stage effects devices.

The system may optionally include the control console, which in turn is configured to output data according to the DMX, CAN, DALI, or other suitable control data transmission protocol. Data formats other than DMX may be used in other embodiments to embody the input signal, such as another serial data format such as DALI RS-232 or RS-485.

Optionally, positive temperature coefficient thermistors (PTCs) or other current leveling devices may be employed in electrical series with each output port power conductor to ensure that no single conductor connected to a given output port carries more than an allotted portion of a total load current.

Power is provided to each P+D output port with an interleaved "soft start", i.e., a calibrated slow ramp up of voltage to minimize port inrush as well as system inrush. The maximum current provided to a detected load is likewise sensed and limited in a sequence so as to limit a maximum inrush current and maximize availability of power to a number of the output ports.

A monitoring device may be included in some embodiments to communicate with a remote device, such as to an RDM-enabled DMX control console or a separate RDM monitor, the status of the power hub and its various P+D output ports, as well as the interface devices and stage effects devices, either via RDM back through the control cable linking such a console to the power hub or via other suitable communication methods.

The power hub is disclosed in another embodiment, including input ports configured to receive multi-channel data as a P+D input signal from a control console, output ports each having data conductors and power conductor pairs, the buffer circuit, the power distribution circuit(s), and sensor circuits as noted above.

In another embodiment, a system for providing electrical power and multi-channel data to stage effects devices includes a power hub configured to receive the multi-channel data as a P+D input signal from a control console, and an interface circuit connected to the power hub. The hub includes a P+D output port having data conductors and power conductor pairs, a power distribution circuit configured to distribute a calibrated output voltage to the output port, and a sensor circuit. The sensor circuit is connected to the output port and configured to detect a connection of the stage effects devices to the output port, as well as to determine a maximum required power to be delivered to the output port to power the stage effects devices by calculating a load resistance on the outlet port. This calculation occurs when the power hub applies the calibrated output voltage.

The above and other features and advantages of the present disclosure will be readily apparent from the following detailed description of the embodiment(s) and best mode(s) for carrying out the disclosure when taken in connection with the accompanying drawings and appended claims.

Figure 1:
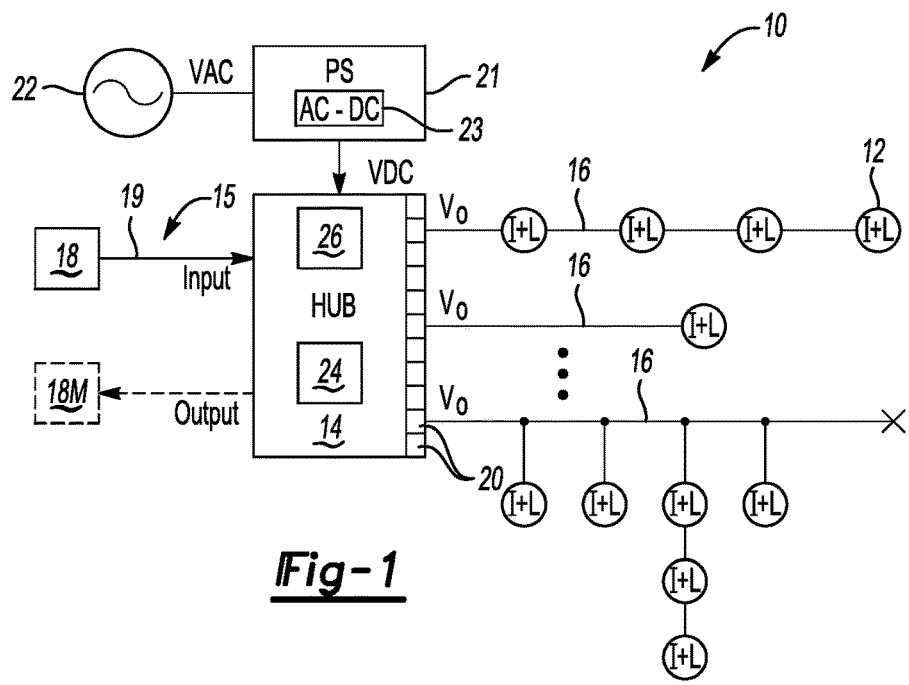
FIG. 1 is a schematic circuit diagram of an example embodiment of a system for supplying power and multi-channel data to connected lighting or other stage effects devices.

The present disclosure is susceptible to various modifications and alternative forms, and some representative embodiments have been shown by way of example in the drawings and will be described in detail herein. Novel aspects of this disclosure are not limited to the particular forms illustrated in the drawings. Rather, the disclosure is intended to cover modifications, equivalents, combinations, or alternatives falling within the spirit and scope of the disclosure as defined by the appended claims.

DETAILED DESCRIPTION

Referring to the drawings, wherein like reference numbers refer to like components, a system 10 is shown in FIG. 1 that is operable for providing electrical power and multi-channel data to a plurality of stage effects devices 12. The stage effects devices 12 may be variously embodied as single-color or multi-color/color-changing light-emitting diode (LED) bulbs, lamps, lighting strips, or other lighting devices, and thus the devices 12 are labeled "L" in the various Figures, and "I+L" in FIG. 1 to also indicate the interface circuit 28 of FIG. 2, for illustrative consistency. However, those of ordinary skill in the art will recognize that other stage effects devices 12 exist such as smoke machines, pyrotechnic devices, mirror balls, simulated waterfalls, and video boards, with the present disclosure extending to include control of such alternative devices.

The system 10 of FIG. 1 includes a power hub 14 and, as described below with reference to FIG. 2, a plurality of interface circuits 26. With respect to the power hub 14, this computer hardware and software assembly is configured to receive a multi-channel input signal 15 from a control device 18 over a length of suitable data cable 19, such as but not limited to a DMX cable. The control device 18 controls operation of the connected devices 12, and may be embodied as a DMX console or a computer running DMX-512A or another suitable channel-based control software of the types known in the art.

The power hub 14 includes or is connected to a power supply (PS) 21, which in turn is connectable to an AC power source 22 such as a conventional 120 VAC wall outlet, with the power supply providing a total of at least 250 W and as much as 1200 W to 2400 W of power in different embodiments. The power supply 21 may optionally include an AC-DC converter 23 operable for providing a DC output voltage (VDC) to the power hub 14.

The power hub 14 also includes a plurality of power plus data (P+D) output ports 20. Each output port 20 has a pair of data conductors and a plurality of power conductor pairs 17 that may connect to corresponding conductor pairs of a mating cable 16. Such conductor pairs are found in CAT5, CAT6, and other Ethernet cables 16 having RJ45 or other suitable end connectors, including but not limited to XLR-type shells or other waterproof strain-relieved shells or fittings. In lieu of RJ45, the output ports 20 may be connected via other multi-conductor cables suitable for combined data and power. The power hub 14 disclosed herein may distribute incoming data to the output ports 20 via DMX, with or without RDM, either directly or via CAN, Artnet or other Ethernet input, e.g., via an alternative protocol-to-DMX decoder accepting CAN, Artnet, DALI, or other suitable communication means.

Figure 1A:
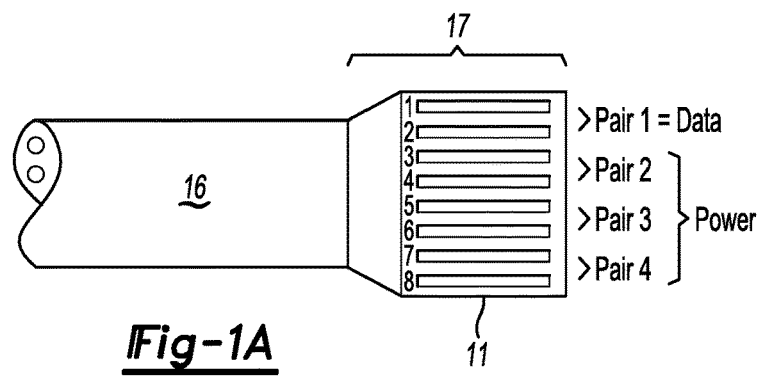
FIG. 1A is a schematic illustration of a portion of a cable having multiple conductor pairs that is usable as part of the example system shown in FIG. 1.

Referring briefly to FIG. 1A, the cable 16 is shown having four different conductor pairs 17, i.e., pairs of a suitable wire 11. There are typically four such conductor pairs 17 in a CAT5 or CAT6 cable, with one conductor pair 17 carrying digital data (DATA) in the form of a bit string and two or more conductor pairs 17 transmitting power (POWER) via corresponding power conductor pairs 17. While one conductor pair 17 is typically used as an electrical ground, leaving two possible conductor pairs 17 for use herein, the grounding pair is not necessarily required due to other grounding circuitry present in the system 10. Thus, as many as three of the conductor pairs 17 may be used to provide power to the stage effects devices 12 within the scope of the present disclosure. The physical order of the pairs is depicted in FIG. 1A in a simplified manner for illustrative clarity. In reality, an Ethernet cable has an odd order of pairs to reduce crosstalk, with the center two conductors 17 numbered 4 and 5 in FIG. 1A forming pair 1, the outer two conductors (1, 8) forming pair 2, the conductors (2, 3) forming pair 3, and conductors (7, 8) forming pair 4.

Referring again to FIG. 1, the power hub 14 also includes a buffer circuit 24. The buffer circuit 24 is operable for receiving the data input signal 15 and splitting, distributing, or otherwise assigning the data to the various P+D output ports 20. The power distribution circuit 26 noted above is configured to receive the input voltage (VDC) from the power supply 21 and distribute a calibrated output voltage ($V_O$) to each of the output ports 20 at a level depending on the needs of the stage effects devices 12 connected via an interface circuit 28 (see FIG. 2) to that particular output port 20, as set forth in greater detail hereinbelow with reference to FIGS. 2-5. In FIG. 1, the present of the interface circuit 28 is indicated schematically by the "I" in the "I+L" label of the devices 12.

The number of P+D output ports 20 of the power hub 14 may vary with the intended application, but in a particular embodiment may include between 8 and 24 output ports 20 each supplied with 48 VDC in a particular embodiment. A length of the cable 16 from a given one of the output ports 20 is limited to about 50 to 100 feet, i.e., substantially shorter cable runs than the 1000 foot runs permitted by the POE standard described above and known in the art. Therefore, between 250-350 W of power may be provided to each run of the cable 16 and to any of the stage effects devices 12 connected thereto. For instance, the stage effects devices 12 may be low-power stage effects devices 12 connected in a daisy-chain arrangement or a single higher-power stage effects device 12, or individually tapped in electrical parallel, provided the total power requirement of each run of cable 16, i.e., the power load on each P+D output port 20, does not exceed a calibrated maximum power level.

As will be described below with reference to FIG. 3, such power-based intelligence is provided via the power hub 14 using a plurality of sensor circuits 35 each connected to a respective one of the P+D output ports 20 of FIG. 1, and configured to detect a connection of the stage effects devices 12 to a respective one of the output ports 20. The sensing circuits 35 are further configured to determine a maximum power required on each output port 20 that is usable by the stage effects devices 12 connected thereto. The power distribution circuit 26 of FIG. 1 is in communication with each of the sensor circuits 35, and is further operable for individually increasing power to each of the output ports 20 at a calibrated ramp rate based on the detected maximum power.

Figure 2:
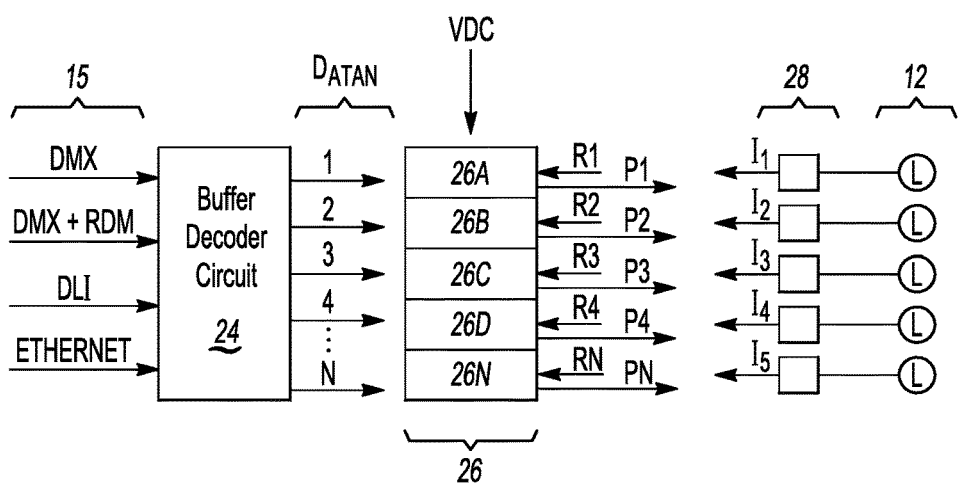
FIG. 2 is a schematic flow diagram of a power hub and interface circuits usable as part of the example system shown in FIG. 1.

Referring to FIG. 2, the interface circuits 28 are shown schematically as being connected in electrical series, each between a corresponding one of the stage effects devices 12 and the distribution circuit 26. The interface circuits 28 are configured to pass a plurality of different channels of received data (DATAN) from the P+D input signal 15 to a respective driver and control circuit 40 (see FIG. 4) of each of the connected devices 12 on a given P+D output port 20. The interface circuits 28 are also operable for connecting the various power conductor pairs 17 to corresponding wiring of the connected devices 12.

The interface circuits 28 may be factory-designed and built into the effects devices, internally added to convert existing devices for use with the present system, or externally-connected to the effects devices 12 as an after-market adapter solution. The interface circuits 28 may accept RJ45 or other input connectors and pass the conductors through to the fixture's internal wiring. Each interface circuit 28 may pass data to pre-existing data reception and "control and power" driver circuits of the effects device 12 while providing a small amount of calibrated electrical resistance across the pairs of conductors, with the resistance being proportional to the maximum power requirement of the connected effects devices 12 on a given P+D output port 20. In this manner, the power hub 14 can determine the suitability and maximum power requirement for each string of connected stage effects devices 12.

Figure 3:
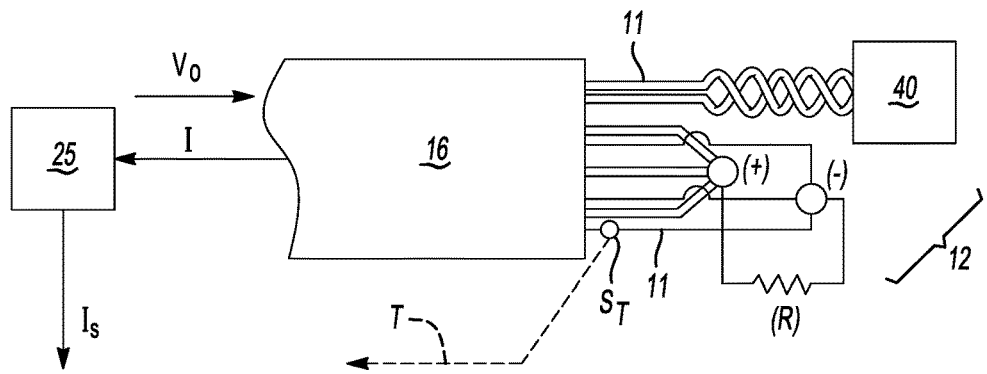
FIG. 3 is a schematic illustration of cable, a sensor, and a solid-state device depicting a sensing function of the power hub shown in FIG. 2.

For instance, as shown schematically in FIG. 3, the cable 16 carrying a particular output voltage ($V_O$) includes the wires 11. The data pair is twisted together and electrically connected to a circuit board (not shown) of a driver and control circuit 40 of the stage effects device 12, such that control data from the power hub 14 is transmitted to a control circuit portion of the circuit 40. That is, while shown as one driver and control circuit 40 for illustrative simplicity, control and power management are different functions performed within the circuit 40, and thus may be embodied as two different circuits as is known in the art. The circuit 40 is operable for converting input power to the voltage and power needed by the driver circuit, e.g., a power supply or LED driver in non-limiting lighting device embodiments. The remaining wires 11 are power conductors having separate positive (+) and negative (−) voltage conductors. The positive conductors are connected together at or within the device 12, as are the negative conductors, as is known in the art. A small variable resistance (R) exists between the conductor pairs 17.

Thus, when the power hub 14 applies the output voltage ($V_O$) to the output port 20 and cable 16, an electrical current (arrow I) in the cable 16 can be sensed, e.g., via an ammeter or other current sensor 25, which in turn reports the sensed current (arrow $I_S$) to the power hub 14. The individual sensed currents are labeled in FIG. 2 as $I_1$, $I_2$, $I_3$, $I_4$, and $I_N$ for clarity. The resistance (R) of each, i.e., $R_1$, $R_2$, $R_3$, $R_4$, $R_N$, can be calculated and used to determine the power requirement presented by the collective load on the output port 20. In this manner, the power hub 14 can detect whether stage effects devices 12 are connected to a given output port 20 and the associated maximum power requirement of the connected devices 12, and then deliver a corresponding required power to each device or devices connected to a particular output port 20, with the power represented in FIG. 2 as $P_1$, $P_2$, $P_3$, $P_4$, $P_N$.

Optionally, a positive temperature coefficient resistor (PTC) or other current sensing/limiting device ($S_T$) may be employed on each power conducting wire 11 in electrical series with each P+D output port 20. A sensed temperature (T) or other value may be communicated back to the power hub 14 and used to help ensure that no single wire 11 connected to a given output port 20 carries more than an allotted portion of a total load current, e.g., with the power hub 14 diverting power to different conductor pairs 17 when an over-temperature condition is detected.

Figure 4:
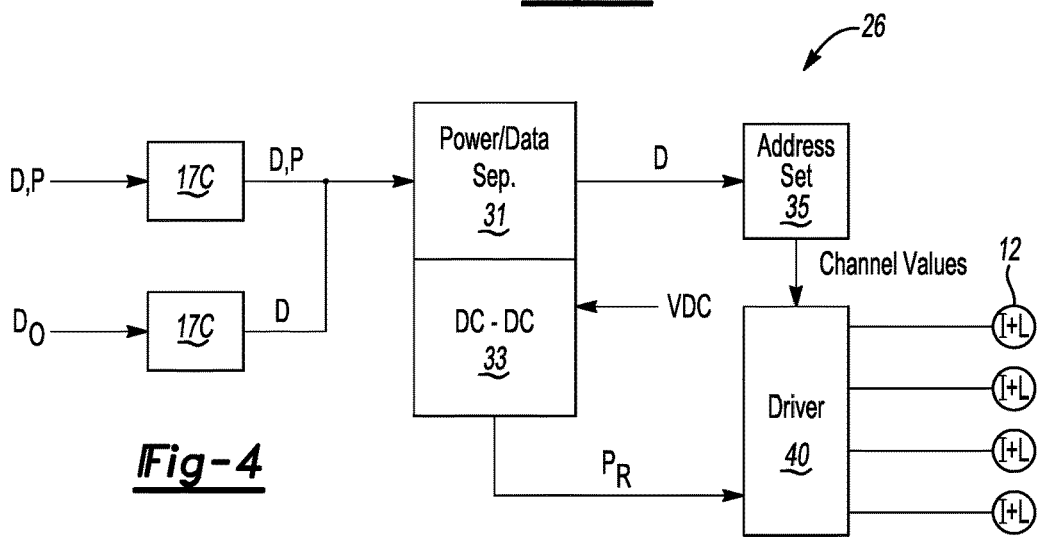
FIG. 4 is a schematic flow diagram describing operation of a power distribution circuit and example device driver circuit used to power multiple stage effects devices.

FIG. 4 is a schematic flow diagram describing operation of the power distribution circuit 26 and an example driver and control circuit 40 used to power multiple stage effects devices 12. End connectors 17C contain the conductor pairs 17 described above. The end connectors 17C, which may be variously embodied as RJ45, etherCON, or other suitable end connectors, provide connectivity for transmitting data (D) and power (P), with some embodiments providing talk-back capability in the form of output data ($D_O$) allowing communication back back to the console 18 shown in FIG. 1.

The power distribution circuit 26 of FIG. 4 may include a power/data separator circuit 31 that is configured to separate the power signals (P) from the data signals (D), such that the data signals (D) are ultimately passed to a receiver/address set block 35 which in turn outputs channel values to the driver and control circuit 40.

Separately, the power distribution circuit 26 may include a DC-DC converter 33 that delivers a required voltage ($P_R$) to the driver and control circuit 40, up to a maximum power value of the power supply 21, to power the connected stage effects devices 12. In other embodiments, an auto-limit/scale option may be envisioned in which the power/data separator module 31 is replaced with a DMX value scaling module (not shown) in which a scaled DMX value is output to the address set 35. For instance, a total amount of currently-used power can be sensed and limited by digital proportional scaling of only the levels of specific control channels relevant to power consuming functions that control parameters such as color drive levels. Such levels can be limited in proportion while leaving other control channels unaffected, e.g., channels that influence position or other low-power functions.

Figure 5:
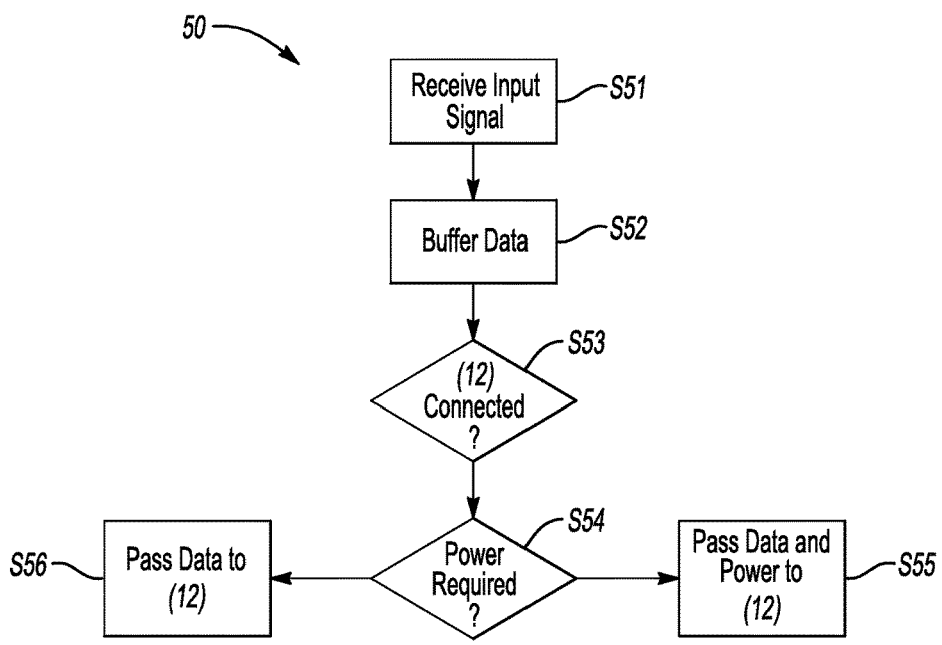
FIG. 5 is a flow chart depicting an example embodiment of a method for distributing power and data to connected stage effects devices as set forth herein.

FIG. 5 depicts an example method 50 for supplying power and multi-channel DMX or other data to the stage effects devices 12 described above. The method 50 begins with step S51 in which multi-channel input data 15 is received by the power hub 14 as shown in FIGS. 1 and 2.

The method 50 then proceeds to step S52 where the received input data signal 15 is buffered within the power hub 14. At step S52, the various addresses of the input data signal 15 are assigned or distributed to a particular P+D output port 20 having the assigned effects devices 12, e.g., as determined beforehand by the console 18. The method 50 then proceeds to step S53.

Step S53 entails determining, via the power hub 14, whether the stage effects devices 12 are connected to a given P+D output port 20. Step S53 may entail apply sensing the current ($I_S$), as a positive current inflow from the stage effects devices 12 is indicative of connected devices 12. If no such connection is detected, the method 50 may repeat step S51, and optionally report the lack of a connection, e.g., via RDM talk-back to the console 18 or optional monitoring device 18M. Lack of connection may be indicative of a given stage effects device 12 having its own power supply, or a faulty stage effects device 12, and therefore such talk-back/feedback may be useful in some embodiments.

At step S54 the power hub 14 next determines whether power is required by the connected device(s) 12 for each P+D output port 20. Similar to the current sensing occurring at step S53, step S54 entails sensing the small resistance (R) across the conductor pairs 17 of the stage effects device 12, which is again possible via the current sensing using sensor 25 of FIG. 3. The sensed resistance (R) is proportional to the maximum power required for a particular group of conductor pairs 17 connected to the output port 20. This sensed resistance, as noted above, is such that several different stage effects devices 12 each of a low wattage may be daisy-chained together on a single output port 20 and the power hub 14 will still sense and provide the total maximum power required by the group of connected stage effects devices 12 as a whole. In other words, the power hub 14 will indicate whether connected load exceeds a capability of the output port 20 to which the load is connected. The method 50 proceeds to step S55 when power is required. The method 50 proceeds in the alternative to step S56 if no power is required.

Step S55 includes passing data and the maximum power for the P+D output port 20 to the stage effects devices 12 connected to the particular output port 20 evaluated in steps S53 and S54. While described for a given output port 20, step S55 occurs across all output ports 20 separately and individually, thereby providing effective control over all connected devices 12.

Step S56 includes passing only data to the stage effects devices 12 connected to the particular output port 20 evaluated in steps S53 and S54.

Accordingly, the above-described system 10 and method 50 help address a number of issues with conventional lighting control methodologies. For instance, solid-state lighting systems typically fail to capitalize on the possible efficiency gains due to large inrush and non-linear load effects, which in turn requires substantial overrating of circuit capacity. The present system 10 instead provides careful load detection and power management to eliminate such over-rating.

As set forth above, the power hub 14 may sense overloads and reduce the voltage sent to the effects devices as a control action. The power hub 14 does not apply power to a given output port and connected effects device unless the hub senses a calibrated resistance and determines that it is appropriate to apply power. The calibrated resistance is such that several devices of lower wattage may be daisy-chained together on a single output port. In such a configuration, the hub will sense and provide a total maximum wattage required by the group of effects devices connected on that particular output port.

The interface circuits 28 in this embodiment have the ability to respond to lower voltage inputs by processing the control data that is output to or within the effects devices in order to reduce DMX levels. This occurs only for the appropriate channels relating to power-consuming circuits, e.g., light level circuits, thereby limiting power usage without causing unacceptable and non-compliant behavior. Such an approach stands in stark contrast to conventional overload behavior, which reacts by pulling even more current in an attempt at compensating for the overload or functions in other inappropriate ways. Such behavior may be coordinated on a port-by-port basis, or on a power hub-wide basis, either through signal level processing or through communication with a driver interface for the various effects devices.

Solid-state lighting systems also typically require the use of separate data and power cables, with the power cables and lamp power supplies rated for 120 VAC or more at higher than utilized currents. The present system instead uses low-voltage at controlled power levels to eliminate the need for overbuilding of the necessary power cabling and distribution hardware.

Additionally, in conventional lighting systems the plugging or unplugging of RJ45 connectors under load can potentially lead to electrical arcing and degradation of the connectors. In the present system, the power hub 14 allows for connection of power only after a physical connection is made to the power hub 14 and the suitability of the load and its associated power requirement is verified. Moreover, the potential hazard of loose conventional cables is eliminated by the presently disclosed load sensing. Likewise, occurrence of large current draw and unequal electrical current across parallel conductors, i.e., the wires 11 of FIG. 3, is largely prevented by the process of load sensing before applying power to the output ports 20.

These and other attendant benefits will be readily appreciated by one of ordinary skill in the art in view of the foregoing disclosure. The detailed description and drawings are supportive and descriptive of the disclosure, but the inventive scope is defined solely by the claims. While some of the best modes and other embodiments for carrying out the disclosure have been described in detail, various alternative designs and embodiments exist for practicing the disclosure as defined in the appended claims.

The invention claimed is:

1. A system for providing electrical power and multi-channel data to a plurality of stage effects devices, the system comprising:
   a power hub configured to receive the multi-channel data as an input signal from a control console configured to control operation of the stage effects devices, the power hub including:
   a plurality of power-plus-data (P+D) output ports each having a plurality of data conductors and at least two power conductor pairs;
   a buffer circuit operable for distributing data from the input signal to the plurality of P+D output ports;
   a power distribution circuit configured to receive an input voltage from the power supply and distribute a calibrated reduced output voltage to each of the P+D output ports at a voltage level that is less than the received input voltage; and
   a plurality of sensor circuits each connected to a respective one of the P+D output ports and configured to detect a connection of at least some of the stage effects devices to the P+D output ports, and to determine a maximum required power to be delivered to each output port to power the stage effects devices connected thereto while preventing an excess current flow to the connected stage effects devices;
   wherein the power distribution circuit is in communication with each of the sensor circuits for each output port, and is operable for individually increasing voltage to each of the output ports at a calibrated ramp rate based on the maximum required power; and
   a plurality of interface circuits each connected to the power hub and configured to connect the data conductors and the power conductor pairs to the stage effects devices, the interface circuits converting input power from the power conductor pairs to a voltage and power required by the stage effects devices, and passing the voltage, the power, and the data to a respective one of the connected stage effects devices.

2. The system of claim 1, wherein the stage effects devices include solid-state lighting fixtures.

3. The system of claim 2, wherein the stage effects devices further include a mirror ball, a smoke machine, a pyrotechnic device, and/or a video device.

4. The system of claim 1, wherein the input signal is a DMX-512A signal.

5. The system of claim 1, wherein the input signal is a DMX-RDM signal.

6. The system of claim 1, wherein the input signal is a DALI RS-232 signal or an RS-485 signal.

7. The system of claim 1, wherein each of the plurality of sensor circuits includes a current sensor, and wherein the sensor circuits detect the connection and the maximum required power using the current sensors.

8. The system of claim 1, wherein the power hub includes the power supply, and the power supply is connectable to AC line power and includes an AC-DC converter operable for outputting the calibrated output voltage.

9. The system of claim 8, wherein the calibrated output voltage is 48 VDC and the power supply provides output power of about 250 W to 2400 W.

10. The system of claim 1, further comprising: a monitoring device in communication with the control console that is configured to display a status of the power hub and each of the P+D output ports.

11. The system of claim 1, wherein each of the P+D output ports is configured to connect to an RJ45 connector.

12. The system of claim 1, wherein when the power hub applies the calibrated reduced output voltage to the P+D output ports, each of the sensor circuits is configured to calculate a resistance of a collective load on a corresponding one of the P+D output ports and use the calculated resistance to determine the power requirement presented by the collective load.

13. The system of claim 1, further comprising a plurality of positive temperature coefficient thermistors each connected in electrical series a respective one of the P+D output ports.

14. The system of claim 1, wherein each of the interface circuits is configured to provide a calibrated electrical resistance across the respective power conductor pairs for a corresponding one of the P+D output ports, the calibrated resistance being proportional to a maximum power requirement of the connected stage effects devices on the given one of the P+D output ports.

15. The system of claim 1, further comprising the control console.

16. The system of claim 1, wherein the buffer circuit is a DMX splitter or an isolated splitter.

17. A power hub for use with a system having a power supply, the system being configured to provide electrical power and multi-channel data to a plurality of stage effects devices via a plurality of interface circuits connected to the power hub, the power hub comprising:
input ports configured to receive multi-channel data as an input signal from a control console;
power-plus-data (P+D) output ports each having data conductors and power conductor pairs;
a buffer circuit configured to distribute data from the input signal to the P+D output ports;
a power distribution circuit configured to receive an input voltage from the power supply of the system and distribute a calibrated reduced output voltage to each P+D output port at a voltage level that is less than the input voltage; and
a plurality of sensor circuits each connected to a respective one of the P+D output ports and configured to detect a connection of some or all of the stage effects devices to the P+D output ports, and to determine a maximum required power to be delivered to each P+D output port to power the stage effects devices connected thereto while preventing excess current flow to the stage effects devices;
wherein the power distribution circuit is in communication with each sensor circuit for each P+D output port, and is configured to increase a voltage to each of the P+D output ports at a calibrated ramp rate based on the maximum required power.

18. The power hub of claim 17, wherein the power hub includes the power supply.

19. A system for providing electrical power and multi-channel data to a plurality of stage effects devices, the system comprising:
a power hub configured to receive the multi-channel data as an input signal from a control console, and having:
a P+D output port having data conductors and power conductor pairs;
a power distribution circuit configured to distribute a calibrated output voltage to the P+D output port; and
a sensor circuit connected to the output port and configured to detect a connection of the stage effects devices to the P+D output port, and to determine a maximum required power to be delivered to the P+D output port to power the stage effects devices by calculating a load resistance on the P+D outlet port when the power hub applies the calibrated output voltage; and
an interface circuit connected configured to connect the power hub, and configured to connect the data conductors and the power conductor pairs to the stage effects devices, to convert input power from the power conductor pairs to a voltage and power required by the stage effects devices, and to pass the voltage, the power, and the data to a respective one of the connected stage effects devices.

* * * * *